United States Patent
Ishida et al.

(10) Patent No.: US 10,895,408 B2
(45) Date of Patent: Jan. 19, 2021

(54) REFRIGERANT COMPRESSOR AND FREEZING APPARATUS USING SAME

(71) Applicant: Panasonic Intellectual Property Management Co., Ltd., Osaka (JP)

(72) Inventors: Yoshinori Ishida, Kyoto (JP); Shingo Oyagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 12 days.

(21) Appl. No.: 16/074,670

(22) PCT Filed: Feb. 10, 2017

(86) PCT No.: PCT/JP2017/004851
§ 371 (c)(1),
(2) Date: Aug. 1, 2018

(87) PCT Pub. No.: WO2017/141825
PCT Pub. Date: Aug. 24, 2017

(65) Prior Publication Data
US 2019/0032971 A1 Jan. 31, 2019

(30) Foreign Application Priority Data
Feb. 19, 2016 (JP) .................. 2016-029407

(51) Int. Cl.
*F04B 15/08* (2006.01)
*F25B 31/00* (2006.01)
(Continued)

(52) U.S. Cl.
CPC ............ *F25B 31/002* (2013.01); *C09K 5/041* (2013.01); *C09K 5/042* (2013.01); *C09K 5/045* (2013.01);
(Continued)

(58) Field of Classification Search
CPC .............................. F25B 31/002; C09K 5/041
See application file for complete search history.

(56) References Cited

U.S. PATENT DOCUMENTS

| 5,531,574 A | 7/1996 | Honma |
| 2006/0001002 A1 | 1/2006 | Iwanami et al. |

(Continued)

FOREIGN PATENT DOCUMENTS

| CN | 101023155 A | 8/2007 |
| JP | 60-003360 | 1/1985 |

(Continued)

OTHER PUBLICATIONS

Front page of Chinese Office Action dated May 10, 2019 for the related Chinese Patent Application No. 201780010449.8. and English Translation of Search Report thereof, May 10, 2019, 3 pages.

(Continued)

*Primary Examiner* — Elizabeth J Martin
*Assistant Examiner* — Nael N Babaa
(74) *Attorney, Agent, or Firm* — Hamre, Schumann, Mueller & Larson, P.C.

(57) ABSTRACT

Refrigerant compressor includes electromotive element, and compression element that is driven by electromotive element, includes a slider, and compresses a refrigerant. Freezer oil that lubricates the slider is added with fullerene having a diameter that ranges from 100 pm to 10 nm.

11 Claims, 6 Drawing Sheets

(51) Int. Cl.
| | |
|---|---|
| *C10M 125/02* | (2006.01) |
| *C10M 171/00* | (2006.01) |
| *F25B 31/02* | (2006.01) |
| *F04B 39/02* | (2006.01) |
| *F04C 29/00* | (2006.01) |
| *C09K 5/04* | (2006.01) |
| *F04B 17/03* | (2006.01) |
| *F04B 39/00* | (2006.01) |
| *F25B 1/02* | (2006.01) |
| *F25D 17/06* | (2006.01) |
| *C10N 20/02* | (2006.01) |
| *C10N 20/06* | (2006.01) |
| *C10N 20/00* | (2006.01) |
| *C10N 30/06* | (2006.01) |
| *C10N 40/30* | (2006.01) |

(52) U.S. Cl.
CPC ...... *C10M 125/02* (2013.01); *C10M 171/008* (2013.01); *F04B 15/08* (2013.01); *F04B 17/03* (2013.01); *F04B 39/0005* (2013.01); *F04B 39/0094* (2013.01); *F04B 39/02* (2013.01); *F04B 39/0215* (2013.01); *F04B 39/0276* (2013.01); *F04B 39/0292* (2013.01); *F04C 29/00* (2013.01); *F25B 31/023* (2013.01); *C09K 2205/106* (2013.01); *C10M 2201/041* (2013.01); *C10M 2203/1006* (2013.01); *C10M 2205/223* (2013.01); *C10M 2207/2805* (2013.01); *C10M 2209/043* (2013.01); *C10M 2209/1033* (2013.01); *C10N 2020/02* (2013.01); *C10N 2020/06* (2013.01); *C10N 2020/101* (2020.05); *C10N 2020/106* (2020.05); *C10N 2030/06* (2013.01); *C10N 2040/30* (2013.01); *F25B 1/02* (2013.01); *F25B 2400/07* (2013.01); *F25B 2400/121* (2013.01); *F25B 2500/16* (2013.01); *F25D 17/062* (2013.01)

(56) References Cited

U.S. PATENT DOCUMENTS

2006/0137386 A1* 6/2006 Itsuki .................. F25B 5/02
62/510
2008/0265203 A1* 10/2008 Hwang .................. B82Y 30/00
252/68
2009/0136375 A1* 5/2009 Iwata .................. F04B 39/0005
418/179
2012/0087822 A1 4/2012 Nakano et al.
2013/0167580 A1* 7/2013 Ishida .................. F01C 21/0809
62/468
2015/0020539 A1 1/2015 Park et al.

FOREIGN PATENT DOCUMENTS

| JP | 7-238885 | 9/1995 |
| JP | 2006-017339 | 1/2006 |
| JP | 2007-248020 | 9/2007 |
| JP | 2011-001897 | 1/2011 |

OTHER PUBLICATIONS

Yang Tiejun, "Industrial Patent Analysis Report—Fluorine Chemical, vol. 26", pp. 77-78, Intellectual Property Publishing House, published in May 2014.
Shi Yang, "Refrigeration Technology (Second Edition)", pp. 11-15, China Light Industry Press, published in Jun. 2015.
The Extended European Search Report dated Oct. 25, 2018 for the related European Patent Application No. 17753083.9.
Lee K et al: "Performance evaluation of nano-lubricants of fullerene nanoparticles in refrigeration mineral oil", Current Applied Physics, North-Holland, Amsterdam, NL, vol. 9, No. 2, Mar. 1, 2009 (Mar. 1, 2009), pp. e128-e131, XP026196918.
Jaekeun Lee et al: "Enhancement of Lubrication Properties of Nano-oil by Controlling the Amount of Fullerene Nanoparticle Additives", Tribology Letters, Kluwer Academic Publishers-Plenum Publishers, NE, vol. 28, No. 2, Aug. 31, 2007 (Aug. 31, 2007), pp. 203-208, XP019534595.
English Translation of Chinese Search Report dated Jan. 2, 2020 for the related Chinese Patent Application No. 201780010449.8, 2 pages.
Communication pursuant to Article 94(3) EPC dated Oct. 15, 2020 for the related European Patent Application No. 17753083.9, 5 pages.
Lee J et al: "Application of fullerene-added nano-oil for lubrication enhancement in friction surfaces", Tribology International, Elsevier Ltd, Amsterdam, NL, vol. 42, No. 3, Mar. 1, 2009 (Mar. 1, 2009), pp. 440-447.

* cited by examiner

REFRIGERANT COMPRESSOR AND FREEZING APPARATUS USING SAME

TECHNICAL FIELD

The present disclosure relates to a refrigerant compressor that is used in a refrigerator, an air conditioner, and the like, and a freezing apparatus using the same.

BACKGROUND ART

In recent years, high-efficiency refrigerant compressors have been being developed in order to reduce the use of fossil fuels from the viewpoint of the protection of the global environment.

Conventionally, examples of a technique that is suitable for an increase in efficiency of refrigerant compressors, as described above, include a technique for forming a phosphate-coating film on sliding surfaces of a piston, a crankshaft, and the like of a refrigerant compressor. It is known that this eliminates unevenness on a machined surface in machining and improves initial conformability between sliding members (see, for example, PTL 1).

It is also known that a carbon-based optical anisotropic sphere having a diameter that ranges from 0.1 μm to 100 μm is added to lubricating oil in order to reduce a friction coefficient of sliding surfaces, and that the carbon-based optical anisotropic sphere is obtained by performing heat treatment on a petroleum or coal-based heavy fraction (see, for example, PTL 2).

In the lubricating oil, the added carbon-based optical anisotropic sphere having a diameter that ranges from 0.1 μm to 100 μm acts as a solid lubricant, and this results in a reduction in the friction coefficient of the sliding surfaces, a reduction in heat generation, and a reduction in wear.

CITATION LIST

Patent Literature

PTL 1: Unexamined Japanese Patent Publication No. 7-238885
PTL 2: Examined Japanese Patent Publication No. 60-3360

SUMMARY OF THE INVENTION

The present disclosure provides a refrigerant compressor having high reliability and high efficiency, and a freezing apparatus using the same.

A refrigerant compressor according to the present disclosure is configured to include an electromotive element, and a compression element that is driven by the electromotive element, includes a slider, and compresses a refrigerant. A fullerene having a diameter that ranges from 100 pm to 10 nm is added to a freezer oil that lubricates the slider.

By doing this, the fullerene is stably supplied to the slider, and acts as a solid lubricant. This can prevent adhesive wear and abnormal wear from occurring, and can reduce friction loss.

In the refrigerant compressor according to the present disclosure, by using the freezer oil that has been added with the fullerene having a diameter that ranges from 100 pm to 10 nm, adhesive wear and abnormal wear can be prevented from occurring. In addition, friction loss can be reduced. Therefore, a refrigerant compressor having high reliability and high efficiency, and a freezing apparatus using the same can be provided.

DESCRIPTION OF EMBODIMENTS

A comparative example is described first, and problems to be solved by the present disclosure are described in detail.

Figure 7:
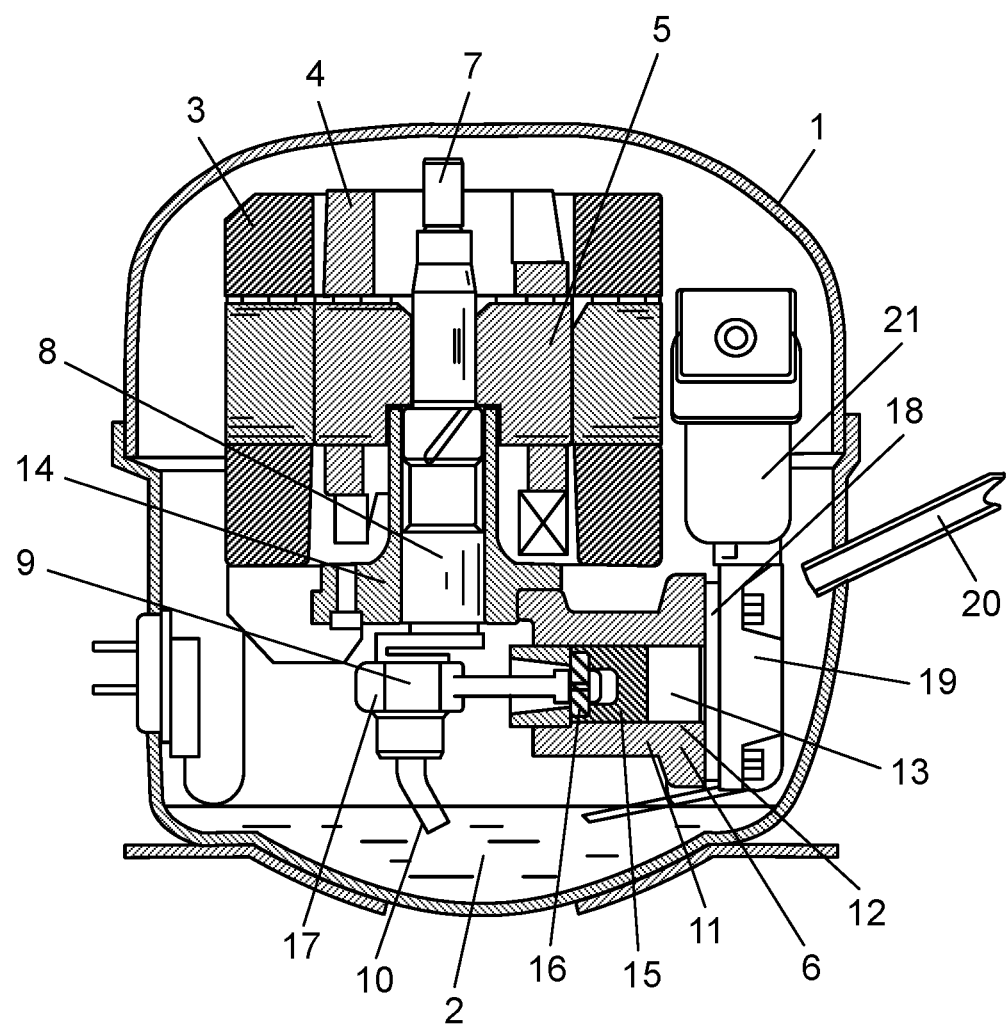
FIG. 7 is a sectional view of a refrigerant compressor in a comparative example of the present disclosure.

FIG. 7 is a sectional view of refrigerant compressor 100 in a comparative example of the present disclosure.

As illustrated in FIG. 7, refrigerant compressor 100 includes sealed container 1. Sealed container 1 stores freezer oil 2 in a bottom. Sealed container 1 houses electromotive element 5 that is configured by stator 3 and rotor 4, and reciprocating compression element 6 that is driven by electromotive element 5.

Details of compression element 6 are described next.

Crankshaft 7 is configured by main shaft 8 into which rotor 4 is press-fitted, and eccentric shaft 9 that is eccentrically formed with respect to main shaft 8. Crankshaft 7 is provided with oil pump 10.

Cylinder block 11 forms compression chamber 13 that is configured by bore 12 having a substantially cylindrical shape (including a cylindrical shape). Cylinder block 11 is provided with bearing 14 that rotatably supports main shaft 8.

Piston 15 that is loosely fitted into bore 12 is connected to eccentric shaft 9 via piston pin 16 by connecting rod 17 serving as connection means. An end face of bore 12 is sealed by valve plate 18.

Head 19 forms a high-pressure chamber. Head 19 is fixed to a side of valve plate 18 opposite to a side on which bore 12 is provided. Suction tube 20 is fixed to sealed container 1 and is connected to a low-pressure side of a refrigeration cycle (not illustrated), and suction tube 20 guides refrigerant gas (not illustrated) into sealed container 1. Suction muffler 21 is clamped by valve plate 18 and head 19.

Main shaft 8 of crankshaft 7 and bearing 14, piston 15 and bore 12, piston pin 16 and connecting rod 17, and eccentric shaft 9 of crankshaft 7 and connecting rod 17 respectively form sliders against each other. In a combination of sliding members made of an iron-based material from among sliding members that configure these plural sliders, an insoluble phosphate-coating film that is composed of a porous crystal is formed on a surface of one of the sliding members.

An operation in the configuration above is described next.

Power from a commercial power supply (not illustrated) is supplied to electromotive element 5, and rotates rotor 4 of electromotive element 5. Rotor 4 rotates crankshaft 7, and piston 15 is driven via connecting rod 17 serving as connection means and piston pin 16 due to an eccentric motion of eccentric shaft 9. Piston 15 reciprocates in bore 12. By doing this, refrigerant gas that has been guided into sealed container 1 through suction tube 20 is sucked from suction muffler 21, and is continuously compressed in compression chamber 13.

Freezer oil 2 is supplied from oil pump 10 to each of the sliders in accordance with the rotation of crankshaft 7. Freezer oil 2 lubricates each of the sliders, and has a sealing function between piston 15 and bore 12.

A rotational motion is performed between main shaft 8 of crankshaft 7 and bearing 14, and rotation speed is 0 m/s during stopping of the refrigerant compressor. At start-up, the rotational motion is started from a metallic contact state. However, by forming the phosphate-coating film in main shaft 8 of crankshaft 7, the phosphate-coating film having initial conformability can prevent abnormal wear due to metallic contact at start-up.

In recent refrigerant compressors, in order to further improve efficiency in the configuration above, freezer oil 2 having a lower viscosity is used, or a sliding length of each of the sliders is designed to be shorter. In this case, the phosphate-coating film described in the comparative example may be worn or abraded early, it may be difficult for the phosphate-coating film to sustain conformability, and long-term wear resistant may be reduced.

Further, in refrigerant compressor 100, a load on main shaft 8 of crankshaft 7 during one rotation of crankshaft 7 greatly changes. According to a change in the load, refrigerant gas dissolved into freezer oil 2 is vaporized and foams between crankshaft 7 and bearing 14, and crankshaft 7 and bearing 14 are more likely to come in metallic contact with each other due to oil film shortage.

Consequently, the phosphate-coating film formed in main shaft 8 of crankshaft 7 may be worn early, a friction coefficient may increase, a heat generation amount may increase in the sliders, and abnormal wear such as adhesion may occur. A similar phenomenon occurs between piston 15 and bore 12, and there is a similar problem.

In the comparative example, even when the above-mentioned lubricating oil descried in PTL 2 is used as freezer oil 2, long-term wear resistant may be reduced.

Stated another way, in refrigerant compressor 100, a clearance between main shaft 8 and bearing 14 that configure a journal bearing generally ranges from more than 10 μm to 30 μm. A clearance between piston 15 and bore 12 in which a reciprocating motion is performed is likely to be smaller and specifically less than 10 μm in order to suppress leakage of a refrigerant during compression and improve efficiency.

A carbon-based optical anisotropic sphere having a diameter that ranges from 30 μm to 100 μm is larger than the clearances between the sliding members, and fails to enter the clearances between the sliding members. The carbon-based optical anisotropic sphere may fail to act as a solid lubricant.

Each of the optical anisotropic spheres having a diameter that ranges from 0.1 μm to 30 μm is smaller than the clearances, but the optical anisotropic spheres are likely to be aggregated due to an influence of intermolecular force. As a result, a size of the aggregated optical anisotropic spheres is greater than the clearances, and the aggregated optical anisotropic spheres may fail to enter the clearances between the sliding members. Even when the aggregated optical anisotropic spheres enter the clearances between the sliding members, the size of the aggregated optical anisotropic spheres is great, and flaws may be generated on surfaces of the sliding members. Friction loss may increase, or adhesive wear and abnormal wear may be triggered.

In addition, refrigerant compressor 100 repeats operating and stopping. Therefore, in particular, in a stationary state of refrigerant compressor 100, precipitation occurs due to a weight of the optical anisotropic sphere itself or a weight of an aggregate of the optical anisotropic sphere. As an example, even when a special dispersant or the like is added and the optical anisotropic spheres or the aggregates are temporarily dispersed in the freezer oil, precipitation will finally occur due to the weight of the optical anisotropic sphere or the aggregate.

As a result, it may be difficult to uniformly disperse the optical anisotropic spheres in the freezer oil and make the optical anisotropic spheres stably act as a solid lubricant during a long time period.

In view of the foregoing, the present disclosure solves the problems above in the comparative example, and provides a refrigerant compressor having high reliability and high efficiency, and a freezing apparatus using the same.

A first aspect of the present disclosure includes an electromotive element, and a compression element that is driven by the electromotive element, includes a slider, and compresses a refrigerant. Freezer oil that lubricates the slider is added with a fullerene having a diameter that ranges from 100 pm to 10 nm.

By doing this, the fullerene is stably supplied between sliding members, and acts as a solid lubricant. Accordingly, adhesive wear and abnormal wear can be suppressed in advance, and long-term reliability can be improved. In addition, friction loss is reduced, and high performance can be achieved.

In a second aspect according to the first aspect, the fullerene may be one of a C60 fullerene, a C70 fullerene, and a higher-order fullerene including a larger number of carbons than a number of carbons of the C70 fullerene, or a mixed fullerene obtained by mixing at least two of the C60 fullerene, the C70 fullerene, and the higher-order fullerene including a larger number of carbons than the number of carbons of the C70 fullerene.

By doing this, adhesive wear can be further suppressed in advance, and long-term reliability can be further improved. All of the fullerenes have activity, and can trap and inactivate a radical reaction that is a starting point of deterioration of the freezer oil under a poor oil condition and at start-up. Accordingly, lubrication performance of the freezer oil can be maintained during a long time period.

In a third aspect according to the first aspect or the second aspect, a shape of the fullerene may be spherical or elliptic.

By doing this, when sliding surfaces facing each other relatively move, the fullerene rotates, and friction between the sliding surfaces becomes rolling friction. This results in a reduction in a friction coefficient of the slider, and high performance can be achieved.

In a fourth aspect according to any one of the first aspect to the third aspect, an additive amount of the fullerene may be less than or equal to a saturating amount of dissolution with respect to the freezer oil.

By doing this, even when the refrigerant compressor stops, a state is maintained where the fullerene is uniformly dispersed in the freezer oil. Accordingly, metallic contact between the sliding members at restart-up can be reduced, and long-term durability can be improved.

In a fifth aspect according to any one of the first aspect to the fourth aspect, the refrigerant compressed by the compression element may be a hydrofluorocarbon (HFC) refrigerant such as R134a, or a mixed refrigerant including the HFC refrigerant. The freezer oil may be one of ester oil, alkylbenzene oil, polyvinyl ether, and polyalkylene glycol, or mixed oil of at least two of ester oil, alkylbenzene oil, polyvinyl ether, and polyalkylene glycol.

By doing this, even when, from the viewpoint of a reduction in power consumption, a freezer oil having a low viscosity is used or a sliding length between respective sliding members is designed to be shorter, abnormal wear can be prevented, and sliding loss can be reduced. Accordingly, a refrigerant compressor having high reliability and high efficiency can be achieved.

In a sixth aspect according to any one of the first aspect to the fourth aspect, the refrigerant may be one natural refrigerant of R600a, R290, and R744, or a mixed refrigerant that includes at least one of R600a, R290, and R744. The freezer oil may be one of mineral oil, ester oil, alkylbenzene oil, polyvinyl ether, and polyalkylene glycol, or mixed oil of at least two of mineral oil, ester oil, alkylbenzene oil, polyvinyl ether, and polyalkylene glycol.

By doing this, abnormal wear can be prevented, and sliding loss can be reduced, and a refrigerant compressor having high reliability and high efficiency can be achieved. By using a refrigerant that has a small greenhouse effect, global warming can be suppressed.

In a seventh aspect according to any one of the first aspect to the fourth aspect, the refrigerant compressed by the compression element may be a HFO refrigerant such as R1234yf, or a mixed refrigerant including the HFO refrigerant. The freezer oil may be one of ester oil, alkylbenzene oil, polyvinyl ether, and polyalkylene glycol, or mixed oil of at least two of ester oil, alkylbenzene oil, polyvinyl ether, and polyalkylene glycol.

By doing this, even when the refrigerant is decomposed due to sliding heat or the like and acidic substances (such as hydrofluoric acid) are generated, the fullerene can trap and inactivate the acidic substances. Therefore, an increase in a total acid number of the freezer oil and aggressiveness against surfaces of the sliding members are reduced, and a refrigerant compressor having high reliability and high efficiency can be achieved. Further, by using a refrigerant that does not have combustibility and that has a small greenhouse effect, global warming can be suppressed.

In an eighth aspect according to any one of the first aspect to the seventh aspect, the electromotive element may be configured to be driven by an inverter at a plurality of operation frequencies.

By doing this, even during a low-speed operation during which a small amount of oil is supplied to each of the sliders and during a severe high-speed operation during which rotation speed increases, loads on the sliders increase, and a viscosity of the freezer oil decreases due to heat generation of the sliders, abnormal wear can be prevented, and high reliability can be maintained. In addition, by optimizing an operation of the refrigerant compressor under the control of the inverter, energy can be saved.

In a ninth aspect according to any one of the first aspect to the eighth aspect, the compression element may include: a crankshaft that includes a main shaft; a cylinder block that includes a bearing that rotatably supports the main shaft, the cylinder block forming a bore; and a piston that is loosely fitted into the bore. The slider may be formed at least between the main shaft and the bearing and between the piston and the bore.

A tenth aspect may be configured to include the refrigerant compressor in any one of the first aspect to the ninth aspect, and a refrigerant circuit in which the refrigerant compressor, a radiator, a decompressor, and a heat absorber are annularly connected to each other by piping.

By doing this, friction loss is reduced, power consumption of the freezing apparatus is reduced by mounting a refrigerant compressor having improved performance, and energy saving can be achieved.

Exemplary embodiments of the present disclosure are described below with reference to the drawings. The present disclosure is not limited to the exemplary embodiments.

First Exemplary Embodiment

Figure 1:
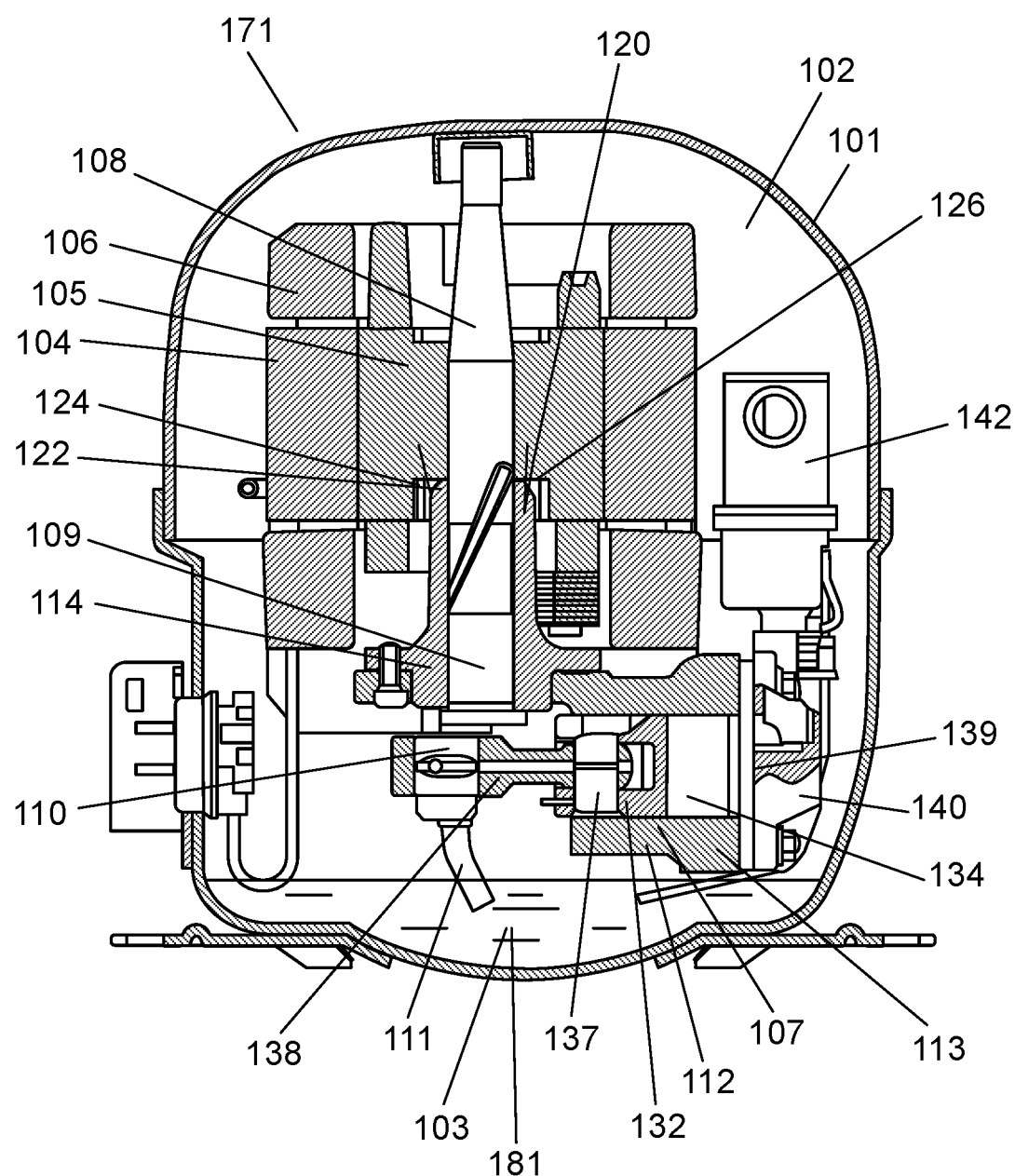
FIG. 1 is a sectional view of a refrigerant compressor according to a first exemplary embodiment of the present disclosure.
Figure 2:
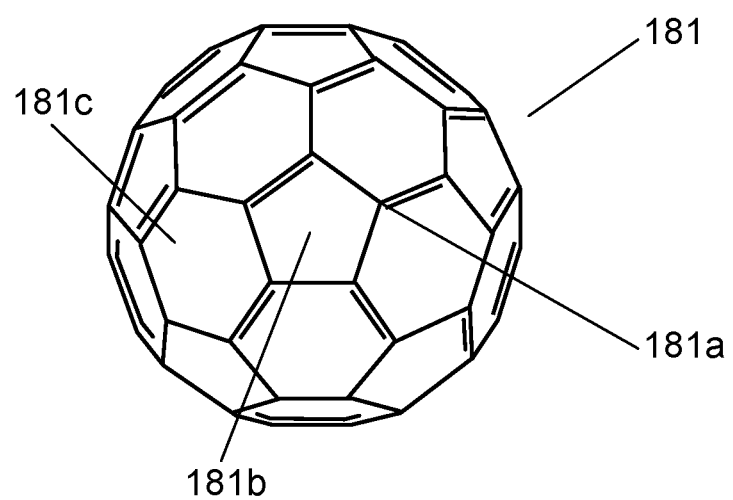
FIG. 2 is a schematic view of a fullerene according to the first exemplary embodiment of the present disclosure.

FIG. 1 is a sectional view of refrigerant compressor 171 according to a first exemplary embodiment of the present disclosure. FIG. 2 is a schematic view of fullerene 181 according to the first exemplary embodiment.

In FIG. 1, sealed container 101 is filled with refrigerant gas 102 that is composed of R134a. Ester oil is stored as freezer oil 103 in a bottom of sealed container 101. Sealed container 101 houses electromotive element 106 that is configured by stator 104 and rotor 105, and reciprocating compression element 107 that is driven by electromotive element 106.

Fullerene 181 is mixed into freezer oil 103, and fullerene 181 is a fine particle for which a section has a substantially circular shape (including a circular shape) and an average particle diameter of the section ranges from 100 pm to 10 nm.

Fullerene 181 is a generic term for a carbon molecule in which carbon atom 181a configures a spherical network structure and that is only composed of carbon atoms 181a. Fullerene 181 is a third carbon allotrope that follows diamond and graphite. Unlike the other carbon allotropes, fullerene 181 can be extracted as a single molecule, and a diameter of the single molecule is about 1 nm.

A most famous example of fullerene 181 is a C60 molecule. As illustrated in FIG. 2, in the C60 molecule, 60 carbon atoms 181a configure a spherical truncated icosahedron that is composed of 12 five-membered rings 181b and 20 six-membered rings 181c. The C60 molecule has a spherical structure having what is called a soccer ball shape, and the C60 molecule is considered to exhibit, in particular, a molecular bearing effect. In addition to C60 described above, C70 that is similarly composed of 70 carbon atoms and higher-order fullerenes that each are composed of a larger number of carbon atoms exist.

A manufacturing process of fullerene 181 is briefly described next.

By performing combustion synthesis on a hydrocarbon raw material using a special combustion process, soot including fullerene 181 is obtained. When the soot is filtered through an organic solvent, fullerene 181 including C60, C70, and higher-order fullerenes is dissolved, and is separated from a residue called nanom black. The dissolved fullerene including C60, C70, and higher-order fullerenes is called a mixed fullerene. By isolating and purifying this fullerene, a mixed fullerene or each type of fullerene simple substance can be obtained.

In the present exemplary embodiment, a mixed fullerene that is composed of C60, C70, and higher-order fullerenes is used as fullerene 181.

These types of fullerene 181 exhibit extremely special characteristics due to a structure of fullerene 181, and are soluble in an organic solvent such as benzene or toluene although fullerene 181 is a carbon allotrope.

Whether fullerene 181 is soluble in ester oil serving as freezer oil 103 is experimentally confirmed below.

At room temperature (25° C.), an appropriate amount of a mixed fullerene was added to ester oil and was sufficiently stirred such that a sample was generated. The mixed fullerene has a diameter that ranges from 100 pm to 10 nm, and is composed of C60, C70, and higher-order fullerenes (such as C76 or C82). The sample was left for a prescribed time period, and whether fullerene 181 had been precipitated and deposited was confirmed. As a result, it was confirmed that ester oil used for this estimation could dissolve fullerene 181. Further, it was confirmed that precipitation and deposition of fullerene 181 occurred at a concentration that exceeds about 0.1% or 0.2%.

From the results above, it has been discovered that fullerene 181 is soluble in ester oil serving as freezer oil 103, namely, a solvent having C=O (a carbonyl structure) or C—O—C (an ether structure). It has also been discovered that a saturating amount of dissolution of fullerene 181 in ester oil serving as freezer oil 103 that was used for this estimation (a ratio at which a maximum amount of fullerene 181 is dissolved in freezer oil 103 in a dissolution phenomenon in which fullerene 181 is dispersed in freezer oil 103 so as to form a homogenous system) ranges from 0.1% to 0.2%.

Next, details of compression element 107 are described below.

Crankshaft 108 is configured by main shaft 109 into which rotor 105 is press-fitted, and eccentric shaft 110 that is eccentrically formed with respect to main shaft 109. At a lower end of crankshaft 108, oil pump 111 is provided that is communicated with freezer oil 103.

Cylinder block 112 made of cast iron forms bore 113 having a substantially cylindrical shape (including a cylindrical shape), and includes bearing 114 that rotatably supports main shaft 109.

Flange surface 120 is formed in rotor 105, and an upper end surface of bearing 114 is thrust surface 122. Thrust washer 124 is inserted between flange surface 120 and thrust surface 122 of bearing 114. Flange surface 120, thrust surface 122, and thrust washer 124 configure thrust bearing 126.

Piston 132 that is loosely fitted into bore 113 so as to have a certain clearance is made of an iron-based material, and piston 132 and bore 113 form compression chamber 134. Piston 132 is connected to eccentric shaft 110 via piston pin 137 by connecting rod 138 serving as connection means. An end face of bore 113 is sealed by valve plate 139.

In a combination of sliding members made of an iron-based material from among main shaft 109 of crankshaft 108 and bearing 114, piston 132 and bore 113, piston pin 137 and connecting rod 138, and eccentric shaft 110 of crankshaft 108 and connecting rod 138 that respectively form sliders against each other, an insoluble phosphate-coating film that is composed of a porous crystal is formed on a surface of one of the sliding members. Specifically, as an example, the phosphate-coating film is formed on each of surfaces of sliding surfaces of crankshaft 108 and piston 132.

Head 140 forms a high-pressure chamber, and is fixed to a side of valve plate 139 opposite to a side on which bore 113 is provided. A suction tube (not illustrated) is fixed to sealed container 101, and is connected to a low-pressure side of a refrigeration cycle (not illustrated). The suction tube guides refrigerant gas 102 into sealed container 101. Suction muffler 142 is clamped by valve plate 139 and head 140.

An operation of refrigerant compressor 171 configured as described above is described below.

Power from a commercial power supply (not illustrated) is supplied to electromotive element 106, and rotates rotor 105 of electromotive element 106. Rotor 105 rotates crankshaft 108. Piston 132 is driven via connecting rod 138 serving as connection means and piston pin 137 due to an eccentric motion of eccentric shaft 110. Piston 132 reciprocates in bore 113, and refrigerant gas 102 that has been guided into sealed container 101 through the suction tube (not illustrated) is sucked from suction muffler 142, and is compressed in compression chamber 134.

Freezer oil 103 is supplied from oil pump 111 to each of the sliders in accordance with the rotation of crankshaft 108. Freezer oil 103 lubricates the sliders, and has a sealing function between piston 132 and bore 113.

In recent refrigerant compressors 171, in order to improve efficiency, freezer oil 103 having a lower viscosity is used, or a sliding length between respective sliding members is designed to be shorter. Stated another way, sliding conditions has changed in a severer direction, namely, in a direction in which an oil film between sliders becomes thinner or is not likely to be formed.

Further, due to gas pressure of refrigerant gas 102 that has been compressed, a fluctuating load that causes a change in a load is imposed between main shaft 109 of crankshaft 108 and bearing 114 of cylinder block 112 and between eccentric shaft 110 that is eccentrically formed with respect to main shaft 109 and connecting rod 138. In accordance with the change in the load, refrigerant gas 102 that has been dissolved in freezer oil 103 is repeatedly vaporized, and foaming is generated, for example, between main shaft 109 and bearing 114. As a result, in a slider, for example, in a slider between main shaft 109 of crankshaft 108 and bearing 114, metallic contact is highly likely to occur due to an oil film shortage.

Under the situation above, in a conventional refrigerant compressor, an insoluble phosphate-coating film that is formed on a surface of a slider and that is composed of a porous crystal is worn or abraded, and disappears early. An iron-based material slides against another iron-based material. Therefore, long-term wear resistant may be reduced.

In contrast, when freezer oil 103 is used that has been mixed with fullerene 181 that is a fine particle for which an average particle diameter of a section ranges from 100 pm to 10 nm, as in the present exemplary embodiment, adhesive wear and abnormal wear can be suppressed in advance, and friction loss can be reduced.

Details are described below.

First, an element experiment was conducted using an amount of dissolution of fullerene 181 as a parameter in order to clarify an action of ester oil on frictional wear characteristics.

A 3 ball-on-disk wear test was conducted using three commercial balls that is made of high-carbon chromium bearing steel (SUJ2) and a disk that is similarly made of high-carbon chromium bearing steel (SUJ2) and that is obtained by polishing a surface with diamond slurry so as to have a surface roughness that is less than or equal to Ra0.01.

Under the assumption of a state in which a phosphate-coating film formed on a surface is worn and a base material is exposed, namely, a state in which an iron-based material slides against another iron-based material, phosphate-coating treatment has not been performed on samples (the balls and the disk) used in this element experiment.

The experiment was conducted using ester oil according to VG10 (a viscosity at 40° C. is 10 mm$^2$/s) as a reference under what is called a poor oil condition under which appropriate amounts of several types of freezer oil with an appropriate amount of fullerene 181 added are dropped on a surface of the disk before the experiment and are not additionally dropped during the experiment.

Prepared types of ester oil are described below.

The following 5 types of ester oil were prepared: a saturated solution (a fullerene concentration ranges from 0.1% to 0.2%); a solution obtained by diluting the saturated solution 1/20 times (the concentration ranges from 0.005% to 0.01%; hereinafter referred to as a 1/20 diluted solution); a solution obtained by diluting the saturated solution 1/5 times (the concentration ranges from 0.02% to 0.04%; hereinafter referred to as a 1/5 diluted solution); a solution obtained by concentrating the saturated solution 5 times (the concentration ranges from 0.5% to 1%; hereinafter referred to as a 5 times concentrated solution); and a solution obtained by concentrating the saturated solution 10 times (the concentration ranges from 1% to 2%; hereinafter referred to as a 10 times concentrated solution).

In the cases of the 5 times concentrated solution and the 10 times concentrated solution, when a prescribed time period passed after these solutions were stirred, a precipitation and deposition phenomenon of fullerene 181 and an aggregate of fullerene 181 occurred. This is presumed to result from a large amount of fullerene 181.

In the cases of the saturated solution, the 1/5 times diluted solution, and the 1/20 times diluted solution, even when these solutions were left during a long time period (60 days) at room temperature, the precipitation and deposition phenomenon did not occur.

In the frictional wear test, ester oil without fullerene 181 added (hereinafter referred to as base oil) was also used in a comparative example.

In the frictional wear test, before the test was started, 10 drops (about 60 μL) of fullerene-added ester oil that had been stirred in an ultrasonic cleaning tank for 30 minutes was dropped on a slider of the disk, and the test was started. The test was conducted under a condition under which a sliding motion is performed at a load of 20 N and a rotation speed of 0.2 m/s for 5 minutes (a sliding distance is 100 m).

From results of the measurement of a friction coefficient during the test and the observation of a sliding mark after the test, a correlation between an amount of dissolution of fullerene 181 and frictional wear characteristics was estimated.

Figure 3:
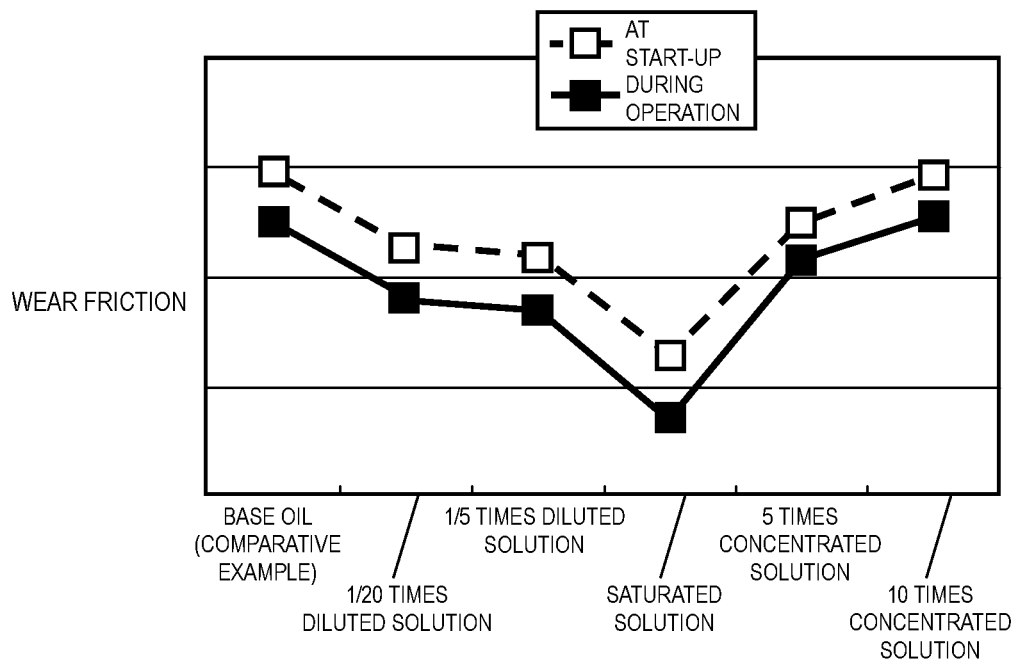
FIG. 3 is a characteristic diagram illustrating a friction coefficient at the time when each type of fullerene-added oil is used in a frictional wear test according to the exemplary embodiment of the present disclosure.

FIG. 3 is a characteristic diagram illustrating a friction coefficient at the time when each type of fullerene-added oil is used in the frictional wear test according to the exemplary embodiment of the present disclosure.

FIG. 3 illustrates a friction coefficient at start-up and a friction coefficient during operation. The friction coefficient at start-up refers to a mean value of friction coefficients that are generated after the test is started and before the sliding distance reaches 10 m. The friction coefficient during operation refers to a mean value of friction coefficients that are generated after the sliding distance reaches 50 m and before the test is finished.

As illustrated in FIG. 3, it has been discovered that friction coefficients at start-up and during operation in the cases of all types of the fullerene-added oil are reduced in comparison with the case of the base oil. Further, it has been discovered that the friction coefficients in the case of the saturated solution are the smallest.

Figure 4:
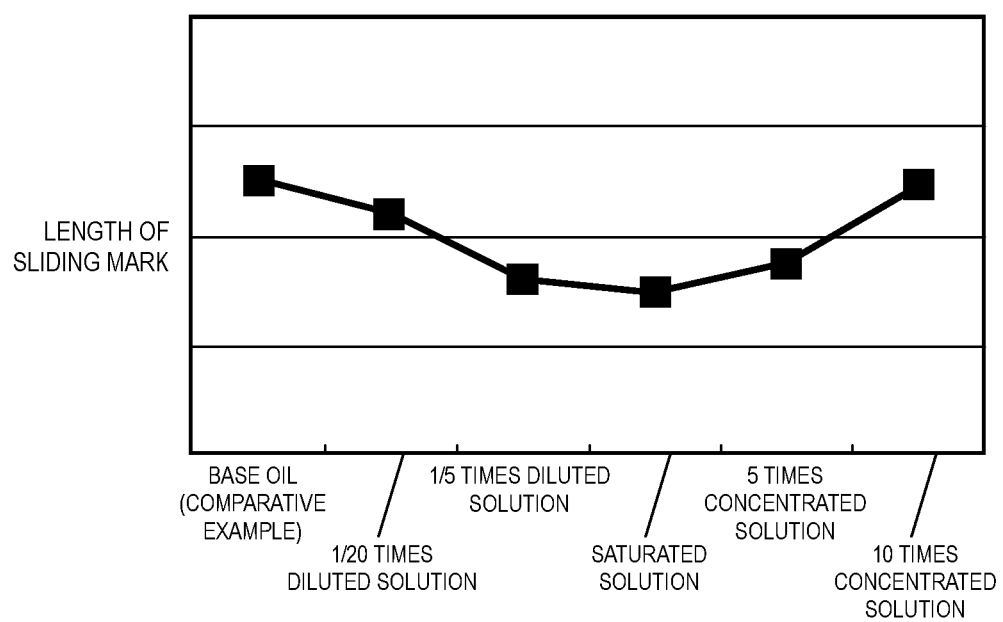
FIG. 4 is a characteristic diagram illustrating a length of a sliding mark generated in a ball at the time when each type of fullerene-added oil is used in the frictional wear test according to the exemplary embodiment of the present disclosure.

FIG. 4 is a characteristic diagram illustrating a length of a sliding mark generated in a ball at the time when each type of fullerene-added oil is used in the frictional wear test according to the exemplary embodiment of the present disclosure.

The length of the sliding mark refers to a maximum length in a direction perpendicular to a sliding direction.

Figure 5A:
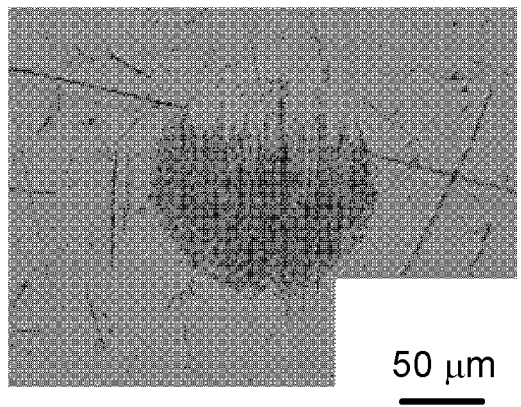
FIG. 5A is an enlarged view illustrating an example of a sliding mark generated in a ball after the frictional wear test according to the exemplary embodiment of the present disclosure.
Figure 5B:
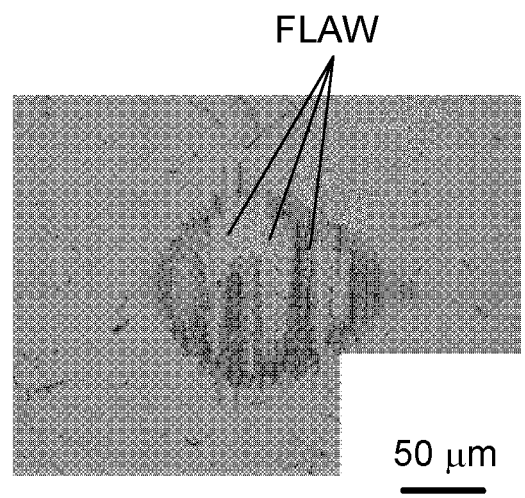
FIG. 5B is an enlarged view illustrating an example of a sliding mark generated in a ball after the frictional wear test according to the exemplary embodiment of the present disclosure.

FIGS. 5A and 5B are enlarged views illustrating an example of a sliding mark generated in a ball after the frictional wear test according to the exemplary embodiment of the present disclosure. FIG. 5A illustrates a sliding mark after the frictional wear test in the case of the saturated solution, and FIG. 5B illustrates a sliding mark after the test in the case of the 5 times concentrated solution.

As illustrated in FIG. 4, the length of the sliding mark in the case of the fullerene-added oil is shorter than the length of the sliding mark in the case of the base oil. In addition, it has been discovered that the lengths of the sliding mark in the cases of the 1/5 times diluted solution, the saturated solution, and the 5 times concentrated solution are relatively short.

As illustrated in FIGS. 5A and 5B, it has also been discovered that, in the case of the 5 times concentrated solution, fine flaws have been generated in a surface of the ball in comparison with the case of the saturated solution. It has been discovered that, in the cases of the 1/20 times diluted solution and the 1/5 times diluted solution, the sliding mark has a form similar to the form illustrated in FIG. 5A, and that, in the cases of the base oil and the 10 times concentrated solution, the sliding mark has a form similar to the form illustrated in FIG. 5B, namely, fine flaws have been generated.

The results above are examined below.

It can be considered that fullerene 181 or a portion of fullerene 181 enters a portion of a slider that is in local contact, and exhibits a solid lubrication effect. Stated another way, it can be considered that lubrication performance of ester oil is compensated for by non-adhesiveness of carbon and a rotational action of a spherical molecule.

In the saturated solution of fullerene 181, the friction coefficient becomes minimum. As an additive amount of the fullerene becomes smaller than the additive amount of the fullerene in the saturated solution, the friction coefficient increases. It can be considered that this is because a decrease in an amount of fullerene 181 that exists in the portion in local contact results in a decrease in an effect that exhibits a solid lubricating action.

As the additive amount of the fullerene becomes larger than the additive amount of the fullerene in the saturated solution, the friction coefficient is likely to increase. It can be considered that this is because fullerene 181 that has not been dissolved and has been deposited or an aggregate formed by aggregating fullerene 181 generates flaws on a surface of a sliding surface.

In view of the foregoing, it can be said that, in order to improve the frictional wear characteristics to the maximum by adding fullerene 181 to freezer oil 103, it is requested that an additive amount of fullerene 181 be a saturating amount of dissolution according to freezer oil 103 to be used. Specifically, the additive amount may range from the saturating amount of dissolution to an additive amount in the 1/20 times diluted solution, and it is preferable that the additive amount range from the saturating amount of dissolution to about an additive amount in the 1/50 times diluted solution.

Next, a durability test using an actual machine was conducted using refrigerant compressor 171.

The following three types of freezer oil 103 were used: the ⅕ times diluted solution; the saturated solution; and the base oil (ester oil). Each of the three types of freezer oil 103 was sealed into refrigerant compressor 171. This test was conducted in a high-temperature high-load intermittent operation mode in which operating and stopping are repeated at short intervals such that wear of main shaft 109 of crankshaft 108 is accelerated.

After an actual-machine reliability test, refrigerant compressor 171 was dismantled, crankshaft 108 was extracted, and a slider of crankshaft 108 was observed.

As a result, when the base oil was used, a large portion of a phosphate-coating film formed on a sliding surface was worn or abraded, and disappeared. In a portion where an iron-based material slides against another iron-based material, flaws that were presumed to result from adhesive wear were generated.

In the cases of the ⅕ times diluted solution and the saturated solution, the phosphate-coating film was remarkably suppressed from being worn in comparison with the case of the base oil, and sliding members were remarkably slightly damaged.

According to the present exemplary embodiment, refrigerant compressor 171 is configured that includes electromotive element 106 and compression element 107 that is driven by electromotive element 106 so as to compress a refrigerant and that uses freezer oil 103 that has been added with fullerene 181 having a diameter that ranges from 100 pm to 10 nm.

By doing this, as is obvious from results of the element experiment and the reliability test using an actual machine, fullerene 181 is stably supplied between sliding members and acts as a solid lubricant, and this enables adhesive wear and abnormal wear to be suppressed in advance. In addition, long-term reliability can be improved, and friction loss is suppressed. Therefore, high performance can be achieved.

In the actual-machine reliability test according to the present exemplary embodiment, an insoluble phosphate-coating film composed of a porous crystal was formed on surfaces of sliding members. According to a result of the element experiment, it is presumed that a similar effect can be achieved in a case where the phosphate-coating film is not formed.

Fullerene 181 has a high electron acceptance due to the structural symmetry illustrated in FIG. 2. Specifically, single fullerene 181 can trap 6 electrons. Accordingly, fullerene 181 is expected to have an effect of removing radical that causes oxidation of freezer oil 103 and refrigerant gas 102 and suppressing freezer oil 103 and refrigerant gas 102 from deteriorating. Therefore, reliability of refrigerant compressor 171 can be secured during a long time period.

Fullerene 181 has a spherical shape or an elliptic shape. When sliding surfaces facing each other relatively move, fullerene 181 rotates, and rolling friction is generated, namely, a molecular bearing effect is exhibited. This results in a reduction in a friction coefficient of a slider, and high performance can be achieved. By reducing torque at start-up, starting performance of refrigerant compressor 171 can be remarkably improved.

In the present exemplary embodiment, ester oil is used as freezer oil 103. A similar effect can be exhibited by adding fullerene 181 to another type of freezer oil 103. It is publicly known that an extreme pressure agent (an anti-wear agent) that is represented, for example, by tricresyl phosphate (TCP) does not act in polar freezer oil 103 that is represented, for example, by ester oil. However, by employing fullerene 181 according to the present exemplary embodiment, a solid lubricating action can be exhibited regardless of whether freezer oil 103 is polar or non-polar.

In addition, in each of mineral oil, alkylbenzene oil, polyvinyl ether, and polyalkylene glycol that are used as freezer oil 103, a saturating amount of dissolution of fullerene 181 ranges from about 0.1% to about 0.5%. When fullerene 181 is excessively added, flaws are generated on a sliding surface due to an influence of a generated aggregate or the like, and a friction reducing effect is reduced. Accordingly, it is preferable that an additive amount of fullerene 181 be less than or equal to the saturated mount of dissolution.

A viscosity of freezer oil 103 always changes due to a change in temperature and a change in pressure in refrigerant compressor 171 and a change in an amount of dissolution of refrigerant gas 102. Therefore, it can be considered that a saturating amount of dissolution of fullerene 181 in actual refrigerant compressor 171 may be smaller than a saturating amount of dissolution of fullerene 181 in a room temperature atmosphere.

Accordingly, in order to suppress fullerene 181 from being deposited and precipitated as much as possible, it is preferable that an additive amount of fullerene 181 be reduced to a minimum necessary amount within a range in which the frictional wear characteristics are improved, namely, that the additive amount of fullerene 181 be smaller than a saturating amount of dissolution at room temperature. Further, even when refrigerant compressor 171 is in a stopping state, a state is maintained where fullerene 181 is uniformly dispersed in freezer oil 103. By doing this, metallic contact between sliding members at restart-up can be reduced, and long-term durability can be improved.

In the present exemplary embodiment, refrigerant gas 102 is R134a refrigerant, and freezer oil 103 is ester oil. Even when any one of other hydrofluorocarbon (HFC) refrigerants or a mixed refrigerant of the other HFC refrigerants is used, and any one of alkylbenzene oil, polyvinyl ether, and polyalkylene glycol or mixed oil of these is used as freezer oil 103, a similar effect, namely, high reliability and high efficiency can be achieved.

Refrigerant gas 102 may be any one of natural refrigerants, such as R600a, R290, or R744, or a mixed refrigerant including these natural refrigerants. As freezer oil 103, any one of mineral oil, ester oil or alkylbenzene oil, polyvinyl ether, and polyalkylene glycol, or a mixture of at least two of these may be used. In this case, a similar effect can be exhibited, and global warming can be suppressed by using refrigerant gas 102 having a small greenhouse effect.

Even when refrigerant gas 102 is any one of hydrofluoroolefin (HFO) refrigerants or a mixed refrigerant of the HFO refrigerants and any one of ester oil, polyalkylene glycol, polyvinyl ether, and mineral oil, or mixed oil of these is used as freezer oil 103, fullerene 181 traps and inactivates an acidic substance (such as hydrofluoric acid) that has been generated when a refrigerant is decomposed due to sliding heat or the like. By doing this, an increase in a total acid number of the freezer oil and aggressiveness against surfaces of sliding members are reduced, and refrigerant compressor 171 having high reliability and high efficiency can be realized. By using a refrigerant that does not have combustibility and that has a small greenhouse effect, global warming can be suppressed.

The present exemplary embodiment has been described using a case where fullerene 181 is directly added to freezer oil 103. For example, at the time of assembly of a compressor, fullerene 181 may be added in advance to lubricating oil to be used in parts such as crankshaft 108, and the lubricating oil may be added by being mixed with freezer oil 103.

In the present exemplary embodiment, refrigerant compressor 171 that is driven by a commercial power supply has been described. The present exemplary embodiment may be applied to refrigerant compressor 171 that is driven by an inverter at a plurality of operation frequencies.

In refrigerant compressor 171 that is driven by an inverter, as described above, sliders are disposed under severe conditions due to a change in rotation speed. Even under the severe conditions described above, namely, during a low-speed operation during which a small amount of oil is supplied to each of the sliders and during a severe high-speed operation during which rotation speed increases, loads on the sliders increase, and a viscosity of freezer oil 103 decreases due to heat generation of the sliders, abnormal wear can be prevented, and high reliability can be maintained. In addition, by optimizing an operation of refrigerant compressor 171 under the control of the inverter, energy can be saved.

Second Exemplary Embodiment

A second exemplary embodiment of the present disclosure is described next.

Figure 6:
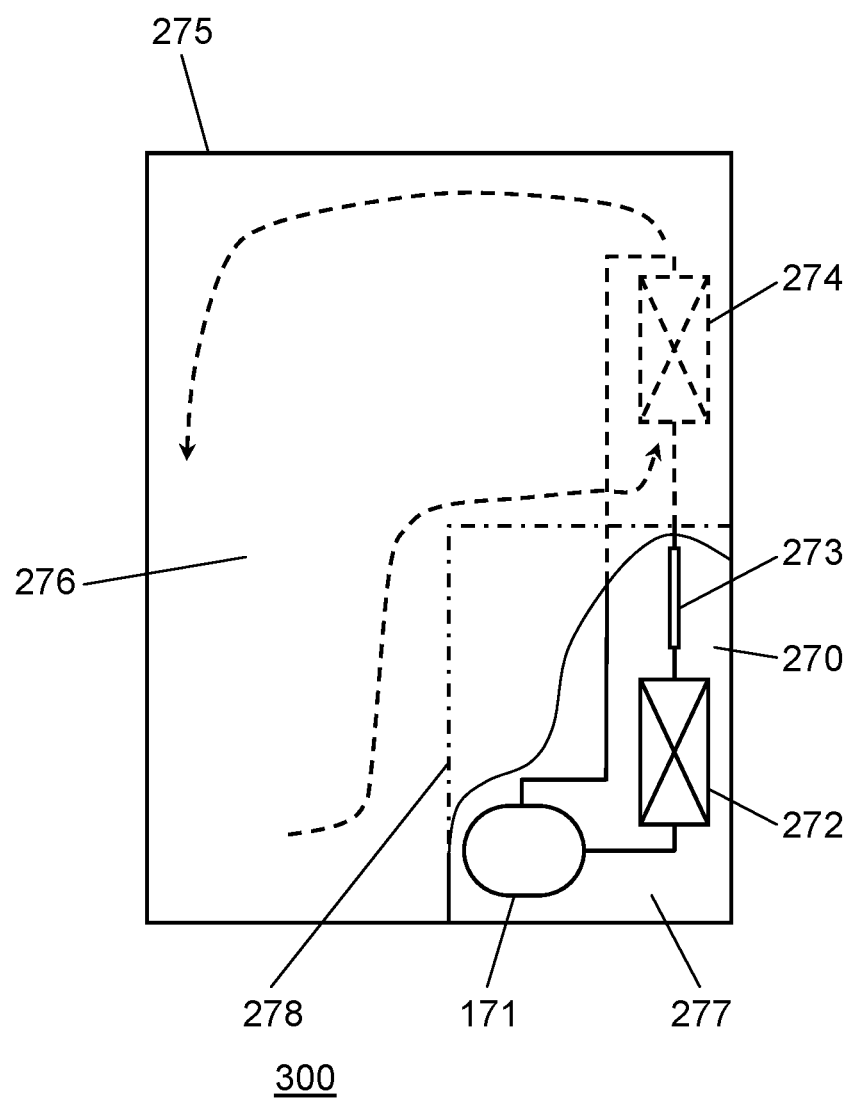
FIG. 6 is a schematic view illustrating a configuration of a freezing apparatus according to a second exemplary embodiment of the present disclosure.

FIG. 6 is a schematic view illustrating a configuration of freezing apparatus 300 according to the second exemplary embodiment of the present disclosure.

An outline of a basic configuration of freezing apparatus 300 in which refrigerant compressor 171 described in the first exemplary embodiment is mounted onto refrigerant circuit 270 is described here.

In FIG. 6, freezing apparatus 300 includes main body 275 that is configured by a heat-insulating box body for which one face is open and a door body that opens or closes an opening of the box body, partition wall 278 that partitions an inside of main body 275 into storage space 276 of objects and machine compartment 277, and refrigerant circuit 270 that cools down an inside of storage space 276.

Refrigerant circuit 270 is configured by annularly connecting refrigerant compressor 171, radiator 272, decompressor 273, and heat absorber 274 by piping.

Heat absorber 274 is disposed in storage space 276 including a blower (not illustrated). Cooling heat of heat absorber 274 is stirred by the blower so as to circulate inside storage space 276, as illustrated by an arrow, and the inside of storage space 276 is cooled down.

By mounting, onto freezing apparatus 300, refrigerant compressor 171 having high reliability and high efficiency that has been described in the first exemplary embodiment of the present disclosure, as described above, long-term reliability can be secured. Further, power consumption of freezing apparatus 300 can be reduced, and energy can be saved.

INDUSTRIAL APPLICABILITY

As described above, according to the present disclosure, a high-reliability refrigerant compressor and a freezing apparatus using the same can be provided using low-viscosity freezer oil. Therefore, the present disclosure is widely applicable to equipment using a refrigeration cycle, and is useful.

REFERENCE MARKS IN THE DRAWINGS

1 sealed container
2 freezer oil
3 stator
4 rotor
5 electromotive element
6 compression element
7 crankshaft
8 main shaft
9 eccentric shaft
10 oil pump
11 cylinder block
12 bore
13 compression chamber
14 bearing
15 piston
16 piston pin
17 connecting rod
18 valve plate
19 head
20 suction tube
21 suction muffler
100 refrigerant compressor
101 sealed container
102 refrigerant gas
103 freezer oil
104 stator
105 rotor
106 electromotive element
107 compression element
108 crankshaft
109 main shaft
110 eccentric shaft
111 oil pump
112 cylinder block
113 bore
114 bearing
120 flange surface
122 thrust surface
124 thrust washer
126 thrust bearing
132 piston
134 compression chamber
137 piston pin
138 connecting rod
139 valve plate
140 head
142 suction muffler
171 refrigerant compressor
181 fullerene
181*a* carbon atom
181*b* five-membered ring
181*c* six-membered ring
270 refrigerant circuit
272 radiator
273 decompressor
274 heat absorber
275 main body
276 storage space
277 machine compartment
278 partition wall
300 freezing apparatus

The invention claimed is:

1. A refrigerant compressor comprising:
an electromotor; and
a compression element that is driven by the electromotor, includes a slider, and compresses a refrigerant,
wherein a freezer oil that lubricates the slider is formed with a fullerene having a diameter that ranges from 100 pm to 10 nm as an additive,
wherein an amount of the fullerene added is less than or equal to a saturation amount for dissolution of the fullerene with respect to the freezer oil,
wherein the saturation amount for dissolution of the fullerene with respect to the freezer oil is a ratio at which a maximum amount of the fullerene is dissolved in the freezer oil in a dissolution phenomenon in which the fullerene is dispersed in the freezer oil so as to form a homogenous system.

2. The refrigerant compressor according to claim 1, wherein
the fullerene is:
one of a C60 fullerene, a C70 fullerene, and a higher-order fullerene including a larger number of carbons than a number of carbons of the C70 fullerene; or
a mixed fullerene obtained by mixing at least two of the C60 fullerene, the C70 fullerene, and the higher-order fullerene.

3. The refrigerant compressor according to claim 1, wherein a shape of the fullerene is spherical or elliptic.

4. The refrigerant compressor according to claim 1, wherein
the refrigerant compressed by the compression element is a hydrofluorocarbon (HFC) refrigerant or a mixed refrigerant including the HFC refrigerant, and
the freezer oil is:
one of ester oil, alkylbenzene oil, polyvinyl ether, and polyalkylene glycol; or
mixed oil of at least two of the ester oil, the alkylbenzene oil, the polyvinyl ether, and the polyalkylene glycol.

5. The refrigerant compressor according to claim 1, wherein
the refrigerant compressed by the compression element is:
one natural refrigerant of R600a, R290, and R744; or
a mixed refrigerant that includes at least one of the R600a, the R290, and the R744, and
the freezer oil is:
one of mineral oil, ester oil, alkylbenzene oil, polyvinyl ether, and polyalkylene glycol; or
mixed oil of at least two of the mineral oil, the ester oil, the alkylbenzene oil, the polyvinyl ether, and the polyalkylene glycol.

6. The refrigerant compressor according to claim 1, wherein
the refrigerant compressed by the compression element is a hydrofluoroolefin (HFO) refrigerant or a mixed refrigerant including the HFO refrigerant, and
the freezer oil is:
one of ester oil, alkylbenzene oil, polyvinyl ether, and polyalkylene glycol; or
mixed oil of at least two of the ester oil, the alkylbenzene oil, the polyvinyl ether, and the polyalkylene glycol.

7. The refrigerant compressor according to claim 1, wherein the electromotor is configured to be driven by an inverter at a plurality of operation frequencies.

8. The refrigerant compressor according to claim 1, wherein
the compression element includes:
a crankshaft that includes a main shaft;
a cylinder block that includes a bearing that rotatably supports the main shaft, the cylinder block forming a bore; and
a piston that is loosely fitted into the bore, and
the slider is formed at least between the main shaft and the bearing and between the piston and the bore.

9. A freezing apparatus comprising:
the refrigerant compressor according to claim 1; and
a refrigerant circuit, wherein the refrigerant compressor, a radiator, a decompressor, and a heat absorber are annularly connected to each other by piping.

10. The refrigerant compressor according to claim 1, wherein the amount of the fullerene added is equal to the saturation amount for dissolution of the fullerene with respect to the freezer oil.

11. The refrigerant compressor according to claim 1, wherein the ratio is in the range from 0.1% to 0.2%.

* * * * *